[Patent No.] 3,595,851
Patented July 27, 1971

3,595,851
PROCESS FOR TREATING POLYMERS AND
PRODUCT THEREOF
Stephen P. Boutsicaris, Akron, and Robert A. Hayes,
Cuyahoga Falls, Ohio, assignors to The Firestone Tire
& Rubber Company, Akron, Ohio
No Drawing. Continuation-in-part of application Ser. No.
715,521, Mar. 25, 1968. This application Aug. 29, 1969,
Ser. No. 854,279
Int. Cl. C08d 5/02; C08f 27/12, 27/14
U.S. Cl. 260—94.7                                20 Claims

ABSTRACT OF THE DISCLOSURE

This invention involves a process for preparing hard, tough, heat-resistant plastics of improved adhesion by the peroxide curing of hydroxy and acyloxy derivatives of butadiene liquid polymers having a molecular weight of 1,000–10,000, and having a high vinyl content, using a peroxide which gives free radicals of the structure $R_2(CH_3)CO\cdot$. Although the peroxide curing of butadiene polymers generally results in products having elastomer properties and being swellable in benzene, the process of this invention permits curing of esterified or hydroxylated butadiene polymers to give rigid, heat-resistant polymers of improved adhesion and wettability. The butadiene polymer prior to esterification or hydroxylation has at least 40%, preferably at least 70% by weight butadiene therein, advantageously having at least 60% and preferably at least 80% of the butadiene in the vinyl-type of repeating units, the average molecular weight being 1,000–10,000, preferably 3,000 to 10,000. After esterification or hydroxylation, the content of vinyl-type of repeating unit is at least 50% of the remaining butadiene repeating units. The proportion of peroxide used, preferably dicumyl peroxide, is 0.5–8, preferably 1–7 parts per 100 parts of polymer, and the curing temperature is at least 250° F. (120° C.), preferably 300–350° F. (150–180° C.). This process lends itself to liquid compounding for the incorporation of the peroxide and any modifiers, and for mixing with filler.

This application is a continuation-in-part of copending application Ser. No. 715,521, filed Mar. 25, 1968.

BACKGROUND OF THE INVENTION

Field of the invention

This invention relates to hydroxy and ester derivatives of butadiene polymers, specifically those derived from butadiene polymers containing at least 60%, preferably at least 80% by weight of butadiene vinyl or 1,2 repeating units, and the process for converting such polymers to hard, rigid, heat-resistant resins by peroxide curing.

Related prior art

Hillyer et al. U.S. Pat. No. 2,838,478 describes a process for oxidizing liquid copolymers of butadiene with hydrogen peroxide in the presence of formic acid or formic esters to produce hydroxylated copolymers. These can be esterified. The products are recommended for use as plasticizers and tackifiers for natural and synthetic rubber, coatings for metals, adhesives and additives for drying oils.

There is no mention in the reference patent for using a high vinyl butadiene polymer nor is there any indication for using a process that would produce a high vinyl butadiene polymer. Moreover, there is no indication of a hydroxylated polymer or ester product of sufficiently high vinyl content that it can be cured nor is there any disclosure as to a curing agent or method whereby such product can be converted to a thermoset resin.

STATEMENT OF THE INVENTION

This invention comprises the process of peroxide curing an hydroxy or acyloxy derivative of butadiene polymers originally having at least 40%, preferably at least 70% by weight of butadiene in the polymer molecule and having at least 60%, preferably at least 80% by weight of the butadiene therein in the vinyl type of butadiene repeating unit structure. The average molecular weight of the butadiene polymer from which the hydroxy or acyloxy derivative is prepared (determined by intrinsic viscosity measurement) is 1,000 to 10,000, preferably 3,000 to 10,000.

The proportion of peroxide used is equivalent to approximately 0.5–8 parts by weight of dicumyl peroxide per 100 parts by weight of polymer, and the peroxide is one which gives radicals having the structure $$R_2(CH_3)CO\cdot$$

where R is a hydrocarbon radical of 1–20 carbon atoms. The amount of peroxy compound used in the curing process of this invention is considerably higher than is normally used for rubber vulcanization.

The curing temperature is advantageously at least 250° F. (120° C.), preferably about 300–350° F. (150–180° C.). Generally no advantage in the process or product is obtained by exceeding a temperature of 420° F. (215° C.). Obviously, the higher the temperature, the shorter will be the curing time required. Generally at 350° F. (180° C.) a satisfactory cure is obtained in less than 30 minutes. This may be reduced considerably with particularly high vinyl content.

Although butadiene homopolymers are preferred for preparing the hydroxy and acyloxy derivatives for the practice of this invention, butadiene copolymers can also be used where the comonomers impart desirable properties and do not detract from the polymer properties. The comonomers are preferably vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alphamethyl styrene, vinyl toluene, isopropenyl toluene, ethyl styrene, p-cyclohexyl styrene, o-, m-, and p-Cl-styrene, vinyl naphthalene, vinyl methyl naphthalene, vinyl butyl naphthalene, vinyl cyclohexyl naphthalene, isopropenyl naphthalene, isopropenyl isopropyl naphthalene, 1-vinyl-4-chloronaphthalene, vinyl diphenyl, vinyl diphenylmethane, isopropenyl, diphenyl, isopropenyl diphenylmethane, vinyl diphenylethane, 4-vinyl-4′-methyl diphenyl, 4-vinyl-4′-chlorodiphenyl, and the like. Where such comonomers are to be used, generally at least 1%, preferably at least 5% by weight should be used and as much as 60% may be used.

It is most surprising that hard, rigid polymers can be produced easily and quickly from the relatively low molecular weight liquid polymers used initially in preparing the intermediate ester or hydroxy polymeric derivatives which in spite of their solid elastic character are not drastically increased in molecular weight. Nevertheless the high proportion of vinyl repeating units in combination with the particular type of peroxide results in the conversion of these intermediate relatively low molecular weight polymeric ester and hydroxy compositions to rigid, hard, thermoset resins having improved adhesive properties with regard to fillers and reinforcing fibers used therein.

The solubility, the molecular weight and the percent vinyl repeating units of the acyloxylated and hydroxylated polymer are very critical elements in the invention. High viscosity and high molecular weight polymers have poor flow, and are much more difficult to compound and to use in molding operations.

The addition of acyloxy or hydroxy groups to the butadiene polymer causes some increase in molecular weight depending on the mole percent and the particular groups added. Advantageously crosslinking during the esterification is kept at a minimum to avoid gelation. Generally, a polybutadiene of 1,000 to 10,000 molecular weight is increased to about 1,060 to 15,000 molecular weight by addition of the derivative groups.

Various methods are known in the art for preparing butadiene polymers of appropriate molecular weight and vinyl content. It is known that anionic polymerization catalysts which are soluble in the particular polymerization system produce polymers with satisfactory molecular weight and vinyl content. Examples of these are the alkyl and aryl lithium catalysts, and aryl sodium catalysts in ether solution, and sodium and lithium complexes with naphthalene or biphenyl in ether solution. Metallic lithium and sodium and alkyl sodiums, which are insoluble, can also be used although they give polymers of broad molecular weight distribution.

Butadiene polymers of appropriate molecular weight and vinyl content can also be prepared by using soluble lithium catalysts to effect the polymerization, such as butyl lithium.

A preferred method of esterifying the butadiene polymer is disclosed and claimed in application Ser. No. 679,511 filed by the same co-inventors Oct. 31, 1968. According to this method, the esterification is effected in the presence of a mixture of sulfuric acid and a saturated aliphatic or aromatic carboxylic acid, preferably acetic acid, the ratio of acetic or other carboxylic acid to sulfuric acid being in the range of 2–25 volumes of carboxylic acid per volume of sulfuric acid. The amount of said acid mixture should be in the range of 0.1 part by weight up to 25 parts by weight of acid mixture per part by weight of polymer. A solvent is advantageously used in which the starting polymer is soluble, preferred solvents being benzene, toluene and hexane, and the amount of solvent is advantageously in the range of 50 to 1,500, preferably about 100 to 1,000 parts per 100 parts by weight of starting polymer. The temperature of esterification can be from room temperature to 150° C., but is advantageously in the range of 70–100° C., preferably about 78–90° C., and the reaction time depends on the temperature used, but advantageously is at least 30 minutes. The nature of the product depends on the molecular weight of the starting polymer and can range from very viscous liquids to hard, thermoplastic resins.

The extent of esterification will depend somewhat on the polymer concentration, the solvent, the sulfuric acid concentration, the acetic acid concentration, the time of reaction, the temperature, etc. In some cases it is desirable to use a solvent having a boiling point at approximately the desired reaction temperature so that refluxing of the solvent will be a convenient means for controlling the temperature. For this reason benzene is a preferred solvent since it boils at a temperature very convenient for the purpose of this process. The carboxylic acid itself such as acetic acid generally very conveniently serves as the solvent.

However solvents of lower or higher boiling points can be used with appropriate means being used for control of the temperature, such as the use of pressure in a closed reactor in the event that the solvent boils at a temperature lower than that desired for the reaction, and thermostatic control of the temperature when a solvent is used having a boiling point higher than the desired reaction temperature. Preferably the solvent has a boiling point lower than that of acetic acid so that it can be distilled off without removing acetic acid.

The carboxylic acid is a saturated aliphatic or aromatic carboxylic acid having no more than 10 carbon atoms. Formic acid can be used, but since there is some formation of carbon monoxide by reaction of the formic acid with the sulfuric acid, it is necessary to use sufficient excess formic acid or to use a means to retard its reaction with sulfuric acid in order to provide sufficient formic acid for esterification.

For this reason the other carboxylic acids are preferred for the esterification, particularly acetic acid. Other preferred carboxylic acids are propionic, butyric, caproic, heptanoic, octanoic, 2-ethylhexanoic, decanoic, benzoic, toluic, phenylacetic, phenylpropionic, cyclohexylacetic acid, naphthoic, methyl naphthoic, etc. The preferred carboxylic acids have 2–10 carbon atoms.

The starting polymer is advantageously dissolved in an appropriate solvent, namely one which is capable of dissolving the butadiene polymer and which has no groups therein which interfere with the desired reaction. Preferred solvents are benzene, toluene, hexane, etc., and the solvent is advantageously used in a proportion to maintain the starting polymer in solution, preferably in a concentration of at least about 2%, advantageously about 10–40% by weight.

The esterified polymer product is processed to remove all traces of sulfuric acid since even traces of sulfuric acid will eventually cause crosslinking and hardening upon standing. It is found desirable also to use an antioxidant to protect against hardening. This is added toward the end of the reaction.

A simple method for determining the percent of acetate groups in a polybutadiene can be based on the carbon analysis. This method is based on the fact that as the percentage of acetate is increased, the percentage of carbon in the polymer is correspondingly decreased. Such a curve is appropriate for any polybutadiene regardless of molecular weight, and also roughly for any hydrocarbon-butadiene copolymer.

The esterified product is also identified by infrared spectrum, which shows the presence of acetate groups, hydroxy groups, etc. In the course of final processing of the product, some of the acetate groups may be displaced by hydrolysis so that the infrared analysis shows the presence of a few hydroxy groups.

Reference to percent of acetate or other derivative group is made on a molar or repeating unit basis, that is "5% of acetate groups" means that 5 out of 100 repeating units in the polymer have acetate groups attached.

While this method of esterification is found highly satisfactory and is preferred, other means for effecting the esterification in a comparable manner can also be used. Regardless of the esterification method used, it is important for the ultimate curing step that at least 50% of the unsaturation remaining in the polymer should be of the vinyl repeating unit type.

Since some of the vinyl unsaturation will be used in the esterification, it is desirable to start with a butadiene polymer having a higher percentage of vinyl repeating units than desired in the derivative polymer. The order of esterification with the respective butadiene repeating units is in the order of cis-1,4, then vinyl-1,2 and last trans-1,4. This order is relatively, but not completely, selective. Therefore, unless there is a substantial proportion of cis-1,4 repeating units in the starting polymer it is advantageous to start with a polymer having sufficient vinyl repeating units to accommodate both the esterification and the curing.

The esterified product can be hydrolyzed by various methods including numerous procedures described in the literature as suitable for hydrolyzing polyvinylacetate to polyvinyl alcohol. Particularly useful for this purpose is alcoholic KOH. The solution concentration and temperature used are not critical but affect the reaction rate. At least stoichiometric amounts of KOH should be used corresponding to the number of ester groups to be hydrolyzed. For practical reaction rates, temperatures of 30–100° C. are preferred and reaction periods of at least 1 hour are desirable. For example, the acetate groups can be completely removed by heating the polymer in alcoholic KOH at 90° C. for 20 hours. Subsequent infrared analysis shows that all the acetate groups have been removed and that hydroxy groups are present in their place.

The hydroxylated butadiene polymer, particularly where the polymer has a comonomer therein, can be prepared directly by reaction with hydrogen peroxide as described in U.S. Pat. No. 2,838,478. However, for the purpose of the present invention it is necessary to start with a butadiene polymer having at least 60% of the butadiene repeating units therein of the pendent vinyl type. The inventors in the cited patent did not recognize that if a high vinyl butadiene polymer is used and the ultimate vinyl content controlled, as indicated herein, the resultant hydroxy or ester product can be cured by the particular type of peroxide catalyst described herein to give a hard, rigid, thermoset resin.

This is particularly surprising, as previously stated, in view of the fact that the starting liquid butadiene polymers are of relatively low molecular weight and even in the intermediate hydroxyl or ester derivative state are still of relatively low molecular weights, and that, by virtue of the combination of high vinyl content and the particular peroxide catalyst, are cured to hard, rigid, thermoset compositions.

The process of this invention lends itself very easily and conveniently to liquid compounding whereby the hydroxylated or acylated butadiene polymer can be blended into solvents for compounding, and the solvent removed prior to fabrication and curing of the polymer-peroxide blend. In solution compounding, the polymer is dissolved or suspended in hexane, heptane, toluene or other solvent such as used in the preparation of the polymer. The solution is mixed with the peroxide and a filler, as well as any other modifiers; next the solvent is removed, for example, by evaporation; and then the polymer composition is processed according to ordinary techniques. If desired, the components may be mixed by mill blending using double arm mixers or other types of internal mixers.

The compounded mixture can be cured in various forms including laminates, and can be molded in any conventional molding equipment including compression, transfer and injection types. The peroxide-cured products of this invention have relatively good color, are generally opaque and have excellent heat resistance. In comparison with corresponding polybutadienes they have improved adhesion. The wetout properties of the derivative polymers for fibers and other fillers are much improved over polybutadiene, and therefore do not require the addition of siloxanes or other modifiers to improve wettability of the fillers.

These acyloxylated and hydroxylated polymers are primarily useful as thermosetting resins and can be used in general where thermoset resins are used, particularly in compression, transfer and injection molding. They can also be used as sealants, adhesives, per se or in solution and also in solution can be used to prepare laminates. These can also be cured and co-cured with other systems such as epoxy resins, sometimes using curing catalysts suitable for such other systems. Moreover, since they convert to elastomeric materials, they can be milled and worked as elastomers.

The peroxides used for the curing are advantageously those having a reasonable fast rate of decomposition at the temperature being used. In some cases it is desirable to use a mixture of peroxides, one having a faster rate of decomposition as the temperature is raised gradually to the desired temperature range, and the other peroxide being slower to decompose in the lower temperature range, but reaching a high rate of decomposition later in the heating period.

The peroxides suitable for use in the practice of this invention can be represented by the formula $$CH_3C(R)_2O-OC(R)_2CH_3$$

wherein R represents aryl or alkyl, including cycloalkyl, aralkyl, alkaryl, etc., of 1–20 carbon atoms. The respective R groups in the particular compounds can be similar or dissimilar Typical R groups include methyl, ethyl, propyl, butyl, hexyl, heptyl, decyl, dodecyl, octadecyl, phenyl, tolyl, xylyl, benzyl, phenethyl, naphthyl, methylnaphthyl, naphthylethyl, diphenyl, benzylphenyl, butylphenyl, cyclohexyl, cycloheptyl, cyclohexylmethyl, cycloheptylethyl, methylcycloheptyl, etc.

Typical peroxy compounds of the above formula which decompose to give the desired free radical, namely $CH_3C(R)_2O\cdot$, include various diperoxides and mixed peroxides. Specific illustrations of these include dicumyl peroxide, ditertarybutyl peroxide, tertiarylbutyl-cumyl peroxide, ditertiaryamyl peroxide, tertiarybutyl-tertiaryamyl peroxide, tertiaryamyl-cumyl peroxide, ditertiaryoctyl peroxide, bis(1,1-diphenyl-ethyl) peroxide, bis(1,1-dicyclohexyl-ethyl) peroxide, bis(1-cyclohexyl-1-methyl ethyl) peroxide, bis(1-phenyl-1-ethyl-ethyl) peroxide, etc. The symmetrical peroxides which have identical groups on each side of the peroxy oxygenations are more easily available and therefore preferable. However, where mixed peroxides, that is peroxides having two different $CH_3C(R)_2O-$ radicals, are available, these can be used very satisfactorily.

The peroxy catalyst is advantageously used in an amount equivalent to .5–8 parts by weight of dicumyl peroxide per 100 parts by weight of polymer. Since the molecular weights of the various peroxy compounds vary, the proportions required to give the same amount of peroxy groups or free radicals is determined by the equivalent weight. Therefore, the proportions of peroxy compound required to effect the desired curing or rate of curing is defined as the amount equivalent to .5–8 parts by weight of dicumyl peroxide. Sometimes commercial peroxides are sold in diluted form such as "Dicup 40C." These can be used, the amount used being calculated according to the actual peroxide content.

The optimum proportion of peroxide depends on the percentage of vinyl repeating units contained in the polymer, the higher vinyl content polymers requiring less catalyst within the indicated range, and the lower vinyl content polymers within the cited percentage range requiring more of the peroxy compound. Preferably 0.5–3 parts of dicumyl peroxide or equivalent amount of other peroxy compound is used for polymers having a vinyl repeating unit content of 80% or more, and 3–5 parts of dicumyl peroxide or equivalent amount of other peroxy compound is preferred for polymers having a vinyl content of 50–80%. Vinyl contents of less than 50% do not produce the desired results of this invention even with the larger amounts of peroxide.

For economic reasons the polymers may be loaded with a high volume of fillers. Advantageously 10–65 volume percent of filler is used. Suitable fillers include silica, asbestos, alumina, mica, feldspar, talc, clay, powdered metal, such as aluminum, iron, brass, zinc and the like, wood flour, cellulosic fibers, carbon black, graphite, etc. Silica is preferred and the other inorganic fillers listed are next in order of preference. Particle size of filler is limited only by practical considerations of mixing and compounding.

In the various curing operations described herein, either with or without filler, advantageously properties are obtained when at least 50%, and preferably at least 70% of the total unsaturation of the polymer is consumed or used up in the curing process. The amount of remaining unsaturation can be determined easily by infrared analysis.

In order to obtain the intimate mixing of the polymers with the large amounts of filler generally used, it is sometimes practical to effect the mixing by liquid or solution compounding. For such purposes it is sometimes desirable to produce the starting polymers in solvent media. With laminates, the solution of resin is used to impregnate a fabric and the solvent is allowed to air dry at room temperature to produce the "prepreg." Other appropriate drying systems can also be used.

The data indicate that a very high crosslinked density is responsible for the improved hardness and heat resistant properties produced according to this invention. The improvements in adhesion and wettability are attributed to the presence of the polar derivative groups.

SPECIFIC EMBODIMENTS OF THE INVENTION

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

Example I

A solution of 400 g. of liquid polybutadiene (mol. wt. 4500, vinyl repeating unit content 67%) dissolved in 800 g. of benzene, is treated with a mixture of 50 ml. of concentrated sulfuric acid and 800 ml. of glacial acetic acid. This is stirred under reflux at 90° C. for two hours. At the end of this time, the dark reaction mixture is cooled to 75° C. and 90 g. of NaOH pellets are added and the mixture stirred under reduced pressure until about ⅔ of the benzene has been distilled off. This is followed by steam distillation to complete the removal of the solvent. The resultant dark, amber-colored lumps are filtered, washed with water on the filter, stirred with one liter of 5% sodium bicarbonate solution, washed again with water, and finally dried in a vacuum oven at 25° C. for 2 days. The product is soluble in tetrahydrofuran, chloroform and toluene and is insoluble in methanol, acetone and water. It has an inherent viscosity of 0.26 in cyclohexane and an acetate content of 16.5%. The spectrum of the product indicates that about 10% of these acetate groups are attached on the vinyl groups of the polybutadiene.

About 25 g. of this product are milled on a mill at room temperature with 30 g. silene filler and 4 g. of 40% dicumyl peroxide. The rubbery blank is subsequently cured in a press at 160° C. for 30 minutes under 4000 p.s.i. pressure. The cured product is a hard rigid plastic which has:

Hardness "M": 101
Heat Distortion Temp. (264 p.s.i.): over 220° C.
Izod Impact: 0.28 ft./lbs./in. notch
Modulus: 500,000 p.s.i.

Example II

A solution of 100 g. of low molecular weight polybutadiene (mol. wt. 5500 and 70.3% vinyl repeating unit) dissolved in 400 ml. of benzene, is treated with a mixture of 10 ml. of 96% sulfuric acid and 200 ml. of glacial acetic acid. This is stirred under reflux at 86° C. for 2 hours. At the end of this time, the dark reaction mixture is cooled to 75° C. and 2 g. of a phenolic antioxidant in 5 ml. of benzene is added to the mixture. Stirring is continued until the temperature reaches 50° C. Then 15 g. of NaOH pellets are added and the mixture stirred under low vacuum until about one-half of the benzene has been distilled off. This is followed by steam distillation to complete the removal of the solvent. The resultant dark, amber-colored lumps are filtered, washed with water on the filter, stirred with 400 ml. of 5% sodium bicarbonate solution, washed again with water, and finally dried in a vacuum oven at 25° C. for 2 days. The resinous product is soluble in tetrahydrofuran, toluene and chloroform and is insoluble in water, methanol and acetone. It has an inherent viscosity of 0.30 in cyclohexanone and has an acetate content of 17.0%. When this material is cured according to the curing procedure of Example I, results similar to those of Example I are obtained.

Example III

An hydroxylated polybutadiene is prepared as follows: A mixture of 80 g. of polybutadiene having a molecular weight of 4500 and vinyl-1,2 of 70%, 400 ml. of benzene, 600 ml. of glacial acetic acid and 25 ml. of 96% $H_2SO_4$ is heated at 90° C. for 1.5 hours. Then sodium hydroxide in slight excess of the stoichiometric amount is added in increments at 40–50° C. and benzene is allowed to distill without external heat. After all the sodium hydroxide is added and benzene distillation has subsided the mixture is steam-distilled following which an antioxidant in acetone is added and the solvent evaporated under vacuum. The product is partially soluble in benzene, very soluble in tetrahydrofuran, and insoluble in methylethylketone, dimethyl formamide and methanol, has an inherent viscosity of 0.45 in cyclohexanone and has an acetate content of 19.6%. This product is treated with alcoholic KOH (50 phr.) for 42 hours at 70° C. The hydroxylated product is insoluble in methanol, soluble in tetrahydrofuran and cyclohexanone and has an inherent viscosity in cyclohexanone of 0.30. Infrared spectrum shows a conversion to hydroxy of 96% and a content of 57% 1,2-vinyl structure in the unhydroxylated butadiene repeating units.

About 25 parts of the hydroxylated polybutadiene is milled to form a rubbery sheet with 25 parts of filler (silene) and 1.25 parts of dicumyl peroxide. After thorough mixing, the product is cured for 20 minutes at 159° C. (316° F.). The cured product has a hardness (M) of 95 (Rockwell), a heat distortion temperature above 210° C. at 264 p.s.i., an Izod impact strength of .31 and a bending modulus of 523,000 p.s.i.

Example IV

The following formulation is stirred in a Baker-Perkins mixer for 15 minutes at room temperature: a solution of 100 parts of the acetylated polybutadiene resin of Example I in 100 parts of hexane, 4 parts of dicumyl peroxide and 117 parts of an equimixture of glass fibers of ½" and 2" lengths. The resulting mixture is transferred to a large evaporation dish and allowed to air dry for two hours, following by 15 minutes drying in an oven at 105° C. The resulting material is calendered to form sheets of 0.02" thickness.

A sheet molding compound (SMC) is formed by placing one double glass mat between two sets of sheets, each set having four of the above calendered sheets. A varnish made up from 65 parts of the resin of Example I and 35 parts of t-butyl styrene and 5 parts of Dicup R (100% dicumyl peroxide) is poured over the glass mat before the second set of sheets is placed in position over the mat. The completed assembly is then pressed under a heavy plate to promote the dispersion of the varnish into the glass mat. The sheet molding compound is tested in a deep draw molding application having the shape of an air-brake diaphragm and gives an almost perfect article of very good properties.

Similar results are obtained when asbestos fibers are substituted for about one-half of the fiber glass in the calendered sheets. Likewise, the resins of Examples II and III are used in the foregoing procedure with similar results. Sheet molding compounds of very good properties are made using varnishes of other resins, such as mixtures of polyester resins in styrene, in the above procedure.

Example V

The procedures of Examples II and III are repeated a number of times using individually in place of the acetic acid an equivalent weight respectively of propionic acid, caproic acid, benzoic acid, phenylacetic acid and cyclohexylacetic acid, adding toluene as a solvent where the acid has a melting point above the 90° C. reaction temperature. Similar results are obtained as in Examples II and III.

Example VI

The procedures of Examples II and III are repeated a number of times using individually in place of the dicumyl peroxide an equivalent weight respectively of:
Ditertiary butyl peroxide;
Ditertiary amyl peroxide;
Bis(1,1-diphenyl-ethyl) peroxide; and
Bis(1,1-dicyclohexyl-ethyl) peroxide.
In each case similar improvements in cure rate are noted together with very good physical properties in the molded products.

Example VII

The procedures of Examples II and III are repeated a number of times using individually in place of the polybutadiene of that example the following polymers:

(a) Polybutadiene, mol. wt. 5,000, 90% vinyl structure in the butadiene repeating units;

(b) Copolymer of 90% butadiene and 10% styrene—mol. wt. 4,000 and 86% of the butadiene content in the vinyl repeating unit structure;

(c) Copolymer of 80% butadiene and 20% vinyl toluene—mol. wt. 6,000 and 80% of the butadiene in the vinyl repeating unit structure;

(d) Copolymer of 85% butadiene and 15% p-chlorostyrene—mol. wt. 6,500 and 75% of the butadiene is in the vinyl type repeating unit structure; and (e) Copolymer of 80% butadiene, 10% styrene and 10% vinyl naphthalene—mol. wt. 5,500 and 83% of the butadiene is in the vinyl type of repeating unit structure.

In each case similar improvements are noted as in Examples I–IV.

Example VIII

The procedures of Examples II and III are repeated a number of times using individually in place of the silica filler an equal weight respectively of particles of alumina, mica, feldspar, talc, asbestos, polyethylene, carbon black and graphite. Similar improvements are noted in each case and excellent wettability and adhesion obtained.

Example IX

The procedures of Examples II and III are repeated a number of times using in place of the calcium stearate an equal weight individually of zinc stearate, magnesium stearate and calcium laurate with similar results. These are processing aids and are not essential to the reaction.

Example X

In order to show the effect of the acetate and hydroxy groups, the curing procedure of Example I is performed on a polybutadiene having a viscosity molecular weight of 5,700 and a vinyl content of 74% using a cure temperature of 177° C. (350° F.) and a cure time of 16 minutes. The cured product is a soft, cheesy material.

When the product of Example X is compared with the cured, hard product of the acetate derivative of Example II, which has approximately the same molecular weight and vinyl content, it is apparent that the presence of the acetate groups have a decided effect on the product obtained on curing. Likewise, comparison with the product of Example III shows the effect of the presence of hydroxy groups on the type of product obtained upon curing.

The process of this invention provides a fast, simple and economical process for producing thermosetting resins of high thermal stability and improved adhesion and wettability. It also provides good workability of the polymer in the pre-cured stage and easy and accurate control of the entire process. The product is processed without the elimination of volatile materials and can be used with starting polymers which have antioxidants or stabilizers therein.

It appears that the invention achieves its improved results on the basis of the combination of the different conditions described, namely the amounts of vinyl structure in the polymer, the presence of the polar groups, the molecular weight as defined, the amounts and type of peroxide, and in the case of fast curing compositions the presence of sufficient filler to avoid crazing and cracking, and the temperature used. This combination of conditions effects a substantial amount of crosslinking in the polymer thereby producing rigidity, resistance to chemicals and heat, and improved adhesion and wettability.

By selecting the conditions described for this invention, it is possible to have a resin molding composition with good flow properties and fast curing and setting cycles to produce resins having a combination of very good properties such as good chemical and heat resistance, very good adhesion and wettability, and high heat distortion and resistance. By careful control of a number of conditions, including dilute solution viscosity or molecular weight, percentage of vinyl-type butadiene repeating units and proportions of peroxy compound and of filler, it is possible to cure these molding compositions in a very short time to give molded products of a variety of excellent properties. The type and amounts of peroxide, the amounts of filler, molecular weights, etc., are as described above.

In fast curing reactions, the high shrinkage and exotherm requires the presence of a filler to avoid cracking and other bad affects. As a filler for this purpose, silica is preferred. It has the advantage of a very low cost and very good physical properties for this purpose. Other materials particularly suitable as fillers include alumina, mica, feldspar, talc, asbestos, clay, powdered metal, such as aluminum, iron, brass, zinc and the like, carbon black, graphite, wood flour, cellulose fiber, etc. Glass fiber as such or in the form of glass cloth or glass mat is also considered as a suitable filler as described hereinafter. As discussed above coupling agents are not necessary for obtaining good wettability and bonding or adhesion between the resin and the glass fiber or other filler. The use of the filler moderates the effects of the heat generated so that very short cure cycles can be used without risking undesirable effects from fast cures.

Molding compositions can be prepared according to this invention comprising essentially (1) a derivative polymer of this invention advantageously having at least 40% by weight, preferably at least 70% by weight butadiene and a molecular weight of 1,000 to 15,000, preferably 3,000 to 15,000.

Resin compositions suitable for injection molding in accordance with the practice of this invention advantageously employ a polymer of the type described herein having a molecular weight of 3,000–15,000. Cure rate can be controlled by proper selection of molecular weight, the percent of vinyl repeating units and the amount of peroxy compound.

Flowability is fundamental to injection molding and essentially a function of molecular weight for a particular polymer. For thermosetting resins, however, the desire to operate at the fastest possible cycle finds flowability threatened and sometimes actually controlled by the onset of cure. Rate of cure can be cotnrolled over a wide range by adjusting either the vinyl repeating unit concentration or the peroxy compound level. It is often desirable to maintain short cure cycles by the use of higher contents of vinyl repeating units.

The resins produced according to the process of this invention are particularly suitable for use in laminates with virtually any type of base-reinforcing material such as glass fiber fabric or mat, burlap, linen, cotton, nylon, polyester, graphite, boron, asbestos fiber, paper and the like. Particular fillers such as silica, alumina and metal powders can also be incorporated into the resin with good strength retention and interesting decorative effects. High tolerance for fillers gives particular economic advantages and very good adhesion and wettability obtained without additives. Very good flexural strength and modulus are obtained.

The preferred procedure in preparing laminates is to pre-impregnate the reinforcing fabric, mat or paper with the resin. Glass fiber mat or fabric is particularly suitable. The resin is advantageously applied to the reinforcing material in the form of a hexane solution. The viscosity and solids content of the solution is easily adjusted by adding more hexane or one of a variety of compatible solvents. The resin may also be extended with a peroxide-curable monomer such as styrene, vinyl toluene, methyl methacrylate and the like, and such monomers may also be used to replace a part or all of the solvent. High boiling tertiary-butylstyrene has been found particularly advantageous where high temperature, low pressure cures are to be used. Monomer-extended systems can be "set" at room temperature and then formed and post-cured in a second step, if desired.

The resin composition of this invention containing the peroxide curing agent and glass or asbestos fibers can be calendered to form a sheet suitable for sheet molding compound as illustrated above in Example IV. The sheet molding compound can comprise one or more such sheets, some adjacent sheets of which may have interposed a fiber glass layer, with or without resin binder of the type presently used for such purposes, or preferably, of the type used in the calendered sheet. The calendered sheet of this invention has as one advantage the fact that there need be no monomeric compound present which may be lost by vaporization. The crosslinking in the polymer used in this invention is obtained through the vinyl groups in the polymer itself. However, where there may be a desire to protect the sheet for any reason, protective films or sheets may be used as in the prior art sheet molding compounds.

The individual calendered sheets can be of any thickness desired, but for practical purposes are in the range of 2 mils to 1 inch thickness. With a plurality of sheets, the composite generally has a thickness of at least 10 mils up to any thickness desired.

Advantageously the calendered sheets have 25–70% glass or asbestos fibers in the composition, and an additional amount of glass fibers interposed between the calender sheets equivalent to 0–20% of the total weight of the sandwich or composite. Preferably the calendered sheets have 25–45% glass or asbestos fibers and the interposed fiber glass is 10–20% of the total weight of the composite.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:
1. The process of preparing a hard, fast-curing resin of improved heat resistant and adhesive properties comprising the steps of:
(A) treating a solution of a butadiene polymer having an average molecular weight of 1,000 to 10,000 and having at least 60% of the butadiene repeating units therein of the pendent-vinyl structure at a temperature from room temperature to 150° C. with a mixture of sulfuric acid of at least 90% concentration and a carboxylic acid having no more than 10 carbon atoms selected from the class consisting of saturated aliphatic and aromatic carboxylic acids, the proportions of said mixture being 2–25 volumes of said carboxylic acid per volume of concentrated sulfuric acid and said acid mixture being used in a proportion of 0.1–25 parts by weight per part by weight of said polymer, said treatment being continued for a period of at least five minutes;
(B) recovering the esterified product from said reaction mass; and
(C) preparing a substantially uniform mixture of:
(a) 100 parts by weight of said esterified butadiene polymer, and
(b) a peroxy compound decomposable in the temperature range being used and having a structure reresented by the formula

$$CH_3C(R)_2O—OC(R)_2CH_3$$

wherein R represents an aryl or alkyl radical of 1–20 carbon atoms, the amount of said peroxy compound being equivalent to 0.5–6 parts by weight of dicumyl peroxide; and
(D) heating said mixture at a temperature of 120°–215° C. for a period of at least 20 seconds, said butadiene polymer comprising, prior to hydroxylation or acyloxylation, a polymer selected from the class consisting of butadiene homopolymers and butadiene copolymers of vinyl aryl and isopropenyl aryl compounds and derivatives thereof having alkyl, aralkyl, cycloalkyl or chlorine attached to the aromatic nucleus thereof, said compounds and derivatives thereof having no more than 20 carbon atoms therein.

2. The process of claim 1 in which said esterified polymer is hydrolyzed prior to mixing with said peroxy compound.

3. The process of claim 2 in which said hydrolyzing is effected by treating said esterified polymer by heating in alcoholic KOH.

4. The process of claim 3 in which said reaction with KOH is effected at a temperature of 30–100° C.

5. The process of claim 4 in which said reaction with KOH is conducted for a period of at least one hour.

6. The process of claim 5 in which said peroxy compound is dicumyl peroxide.

7. The process of claim 6 in which said butadiene polymer is polybutadiene.

8. The process of claim 1 in which said peroxy compound is dicumyl peroxide.

9. The process of claim 1 wherein said carboxylic acid is acetic acid.

10. The process of claim 9 wherein said carboxylic acid treatment is effected at 78–90° C.

11. The process of claim 10 wherein said carboxylic acid treatment is effected for at least 30 minutes.

12. The process of claim 11 wherein said butadiene polymer is a butadiene homopolymer.

13. The process of claim 12 wherein said butadiene homopolymer has at least 80 percent of the butadiene repeating units of the pendent-vinyl structure.

14. The process of claim 13 wherein said peroxy compound is dicumyl peroxide.

15. A thermosetting composition comprising:
(a) 100 parts by weight of a butadiene polymer prepared according to the process of claim 9 having at least 50% of the repeating units therein comprising butadiene repeating units, having an average molecular weight of 1,000 to 15,000 therein and at least 50% of the unreacted butadiene repeating units therein being of the pendent-vinyl structure; and
(b) a peroxy compound having the formula $$CH_3C(R)_2O—OC(R)_2CH_3$$

wherein R represents an aryl or alkyl radical having 1–20 carbon atoms therein, the amount of said peroxy compound being equivalent to 0.5–6 parts by weight of dicumyl peroxide, the remainder of the repeating units in said butadiene polymer being derived from vinyl monomers selected from the class consisting of butadiene and vinyl aryl and isopropenyl aryl compounds and derivatives thereof having alkyl, aralkyl, cycloalkyl or chlorine attached to the aromatic nucleus thereof, said compounds and derivatives thereof having no more than 20 carbon atoms therein.

16. The thermosetting composition of claim 15 in which said peroxy compound is dicumyl peroxide.

17. The thermosetting composition of claim 16 in which said polymer has a molecular weight of at least 3,000.

18. The thermosetting composition of claim 17 which also contains 25–65 volume percent of a filler material substantially inert to said peroxy compound and to said butadiene polymer.

19. A hard resinous product produced by heating the thermosetting composition of claim 15 at a temperature of at least 120° C. for a period sufficient to reduce the unsaturation therein to less than 50% of the original unsaturation in the polymer of said thermosetting composition.

20. The product of claim 19 in which at least 70% of said unsaturation has been consumed by said heating.

References Cited
UNITED STATES PATENTS

| | | | |
|---|---|---|---|
| 2,772,254 | 11/1956 | Gleason et al. | 260—85.1 |
| 2,819,255 | 1/1958 | Boardman | 260—85.1 |
| 3,105,856 | 10/1963 | Crouch | 260—680 |
| 3,135,716 | 6/1964 | Uraneck et al. | 260—45.5 |
| 2,838,478 | 6/1958 | Hillyer et al. | 260—85.1 |

OTHER REFERENCES

Reactions Between Peroxide and Polydiolefins by Van Der Hoff, vol. 2, No. 4, December 1963, I&EC Product Res. and Development.

JAMES A. SEIDLECK, Primary Examiner

W. F. HAMROCK, Assistant Examiner

U.S. Cl. X.R.

260—17.4, 41.5, 85.1, 680; 161—203, 205, 249, 250